(12) United States Patent
Hill

(10) Patent No.: US 9,427,681 B2
(45) Date of Patent: Aug. 30, 2016

(54) MULTI-PURPOSE SELF-CLEANING FILTER SYSTEM

(71) Applicant: MET WELD INTERNATIONAL LLC, Altamont, NY (US)

(72) Inventor: Daniel L. Hill, Altamont, NY (US)

( * ) Notice: Subject to any disclaimer, the term of this patent is extended or adjusted under 35 U.S.C. 154(b) by 638 days.

(21) Appl. No.: 13/783,631

(22) Filed: Mar. 4, 2013

(65) Prior Publication Data

US 2014/0246387 A1    Sep. 4, 2014

(51) Int. Cl.
| | | |
|---|---|---|
| B01D 29/11 | (2006.01) | |
| B01D 36/04 | (2006.01) | |
| B01D 33/46 | (2006.01) | |
| B01D 21/26 | (2006.01) | |
| B01D 29/64 | (2006.01) | |
| B01D 29/90 | (2006.01) | |
| B01D 33/073 | (2006.01) | |

(52) U.S. Cl.
CPC ........... *B01D 29/114* (2013.01); *B01D 21/267* (2013.01); *B01D 29/6446* (2013.01); *B01D 29/906* (2013.01); *B01D 29/908* (2013.01); *B01D 33/073* (2013.01); *B01D 33/463* (2013.01); *B01D 36/045* (2013.01)

(58) Field of Classification Search
CPC  B01D 29/114; B01D 33/462; B01D 33/073; B01D 21/267; B01D 29/6446; B01D 29/908
See application file for complete search history.

(56) References Cited

U.S. PATENT DOCUMENTS

| | | | |
|---|---|---|---|
| 3,289,631 A | 12/1966 | Laval | |
| 3,512,651 A | 5/1970 | Laval | |
| 3,947,364 A | 3/1976 | Laval | |
| 4,948,396 A | 8/1990 | Barnes | |
| 5,478,484 A * | 12/1995 | Michaluk | B01D 29/114 209/719 |
| 5,565,095 A * | 10/1996 | Snowball | B01D 33/073 210/116 |
| 6,177,022 B1 | 1/2001 | Benenson | |
| 6,517,722 B1 | 2/2003 | Benenson | |
| 6,712,981 B2 | 3/2004 | Benenson | |
| 6,861,004 B2 | 3/2005 | Benenson | |
| 7,000,782 B2 | 2/2006 | Walton | |
| 7,032,760 B2 | 4/2006 | Walton | |
| 7,347,933 B2 | 3/2008 | Berry | |
| 7,364,662 B2 | 4/2008 | Laing | |

* cited by examiner

*Primary Examiner* — David A Reifsnyder
(74) *Attorney, Agent, or Firm* — Graham S. Jones, II

(57) ABSTRACT

A vertically oriented vessel has a swirl plate spiraling around its inner wall surface. A nozzle injects unclean liquid onto the lower surface of the swirl plate for deflection of liquid down towards the bottom of the vessel to generate a liquid vortex flowing causing particulates to precipitate. Above the swirl plate, a preferably cylindrical filter element that filters out particulates is cleaned periodically The filter rotates on a shaft so a high pressure sprays of clean process liquid from an array of nozzles juxtaposed with the filter cleans the filter surface as particulates are flushed from the vessel.

13 Claims, 7 Drawing Sheets

MULTI-PURPOSE SELF-CLEANING FILTER SYSTEM

BACKGROUND OF THE INVENTION

This invention relates to filter systems and methods for cleaning liquids by removing unwanted contaminants and particulates from liquids and to systems and methods for cleaning unwanted contaminants and particulates from the filter elements employed in such filter systems.

In the past filter systems for cleaning liquids equipped with filter systems for removing contaminants and particulates have periodically cleaned the filter elements by using mechanical contact devices in the form of scrubbing, scraping or brushing particulates from the surfaces of the filter elements. The mechanical contact method can damage the face of the filter elements leading to their early failure with the result of requiring early replacement thereof. Moreover excessive amounts of contaminants and particulates have reached the filter elements, thereby requiring more frequent cleaning of the filter elements and concomitantly reducing the efficiency of the filter systems.

Accordingly it is an object of this invention to provide apparatus and a method for cleaning such filter elements without damaging the filter elements by mechanical contact with the filter elements.

Another object of this invention is to reduce the amount of particulate material which reaches the filter elements.

In accordance with this invention, a vessel comprises a vessel which is a vertically oriented container. A swirl plate spirals around on the inner wall surface of the vessel. A nozzle injects unclean liquid onto the lower surface of the swirl plate so that the swirl plate deflects the unclean liquid down towards the bottom of the vessel generating a liquid vortex flowing causing particulates to precipitate towards the bottom of the vessel. Above the swirl plate, a generally cylindrical filter collects particles on its exterior surface. In a filter element cleaning cycle, the filter element rotates on a shaft and is cleaned periodically by high pressure sprays of clean process liquid from nozzles juxtaposed with the filter; and the particulates are flushed from the vessel.

The downwardly sloped swirl plate affixed to the inner surface of the vessel is provided to direct the liquid downwardly thereby generating a liquid vortex in the lower portion of the vessel. The vortex is created as a liquid is ejected from the inlet nozzle directed thereby tangentially to the vessel wall at a relatively high velocity. The liquid vortex separates some suspended contaminants and particulates from the liquid before it flows upwardly and passes through a filter. In particular, the swirl plate in the vessel induces the vortex, which creates a centrifugal force causing the heavier particulates to migrate outwardly onto the inner surface of the wall of the vessel. Simultaneously the vortex forces all of the liquid to flow downwardly initially, away from the filter element as the liquid carries all of the heavier particulates downwardly therewith. as a result, the heavier particulates settle out at the bottom of the vessel. As the liquid reaches the bottom of the vessel it reverses direction and flows upwardly in a central column within the vortex, thus allowing cleaner liquid to flow through the central column, within the center of the vortex, towards the filter element located closer to the top of the vessel. However, the particulates remaining suspended within the liquid flows upwardly towards the filter element. As liquid flows though the filter element, it removes additional particulates therefrom during the filtering operation of the filtering system of this invention.

The filter element is adapted to be rotated by a motorized filter assembly which is mounted by flanges to the upper portion of the vessel. During the periodic filter cleaning operation of the system of this invention, the filter element is cleaned by removing particulates therefrom. An array of high pressure spray cleaning nozzles juxtaposed with the filter element direct a plurality of flat sprays of process liquid tangentially to the surface of the rotating filter, which efficiently cleans the outer surface of the filter element.

Removing the particulates from the exterior of the filter element restores the filter element to a clean condition, thus allowing the filter element to remain in operation for longer durations and thereby extending the life of the filter element, while flushing of particulates to the bottom of the vessel where they are collected until such time as they are removed from the vessel through a drain at the bottom thereof.

BRIEF DESCRIPTION OF THE DRAWINGS

FIG. 2A is an operational diagram illustrating two sets of liquid flow control valves for operation of the system in the filtering mode and the cleaning mode of operation of the system. The inlet valve is open during the filtering mode but the cleaning mode valves are closed. During the filtering mode, liquid is flowing into and through the vessel up through the filter element and out through the discharge nozzle while particulates are being filtered out of the liquid flowing through the system.

FIG. 2B is an operational diagram of the cleaning mode illustrating the open clean process liquid valve and the closed drain line valve which permit cleaning liquid flow during the cleaning operation of the system. During the cleaning mode, the closed inlet valve prevents unclean liquid from flowing through the liquid inlet and up through the vessel thereby not being discharged from the discharge nozzle.

DESCRIPTION OF THE PREFERRED EMBODIMENT

Figure 1:
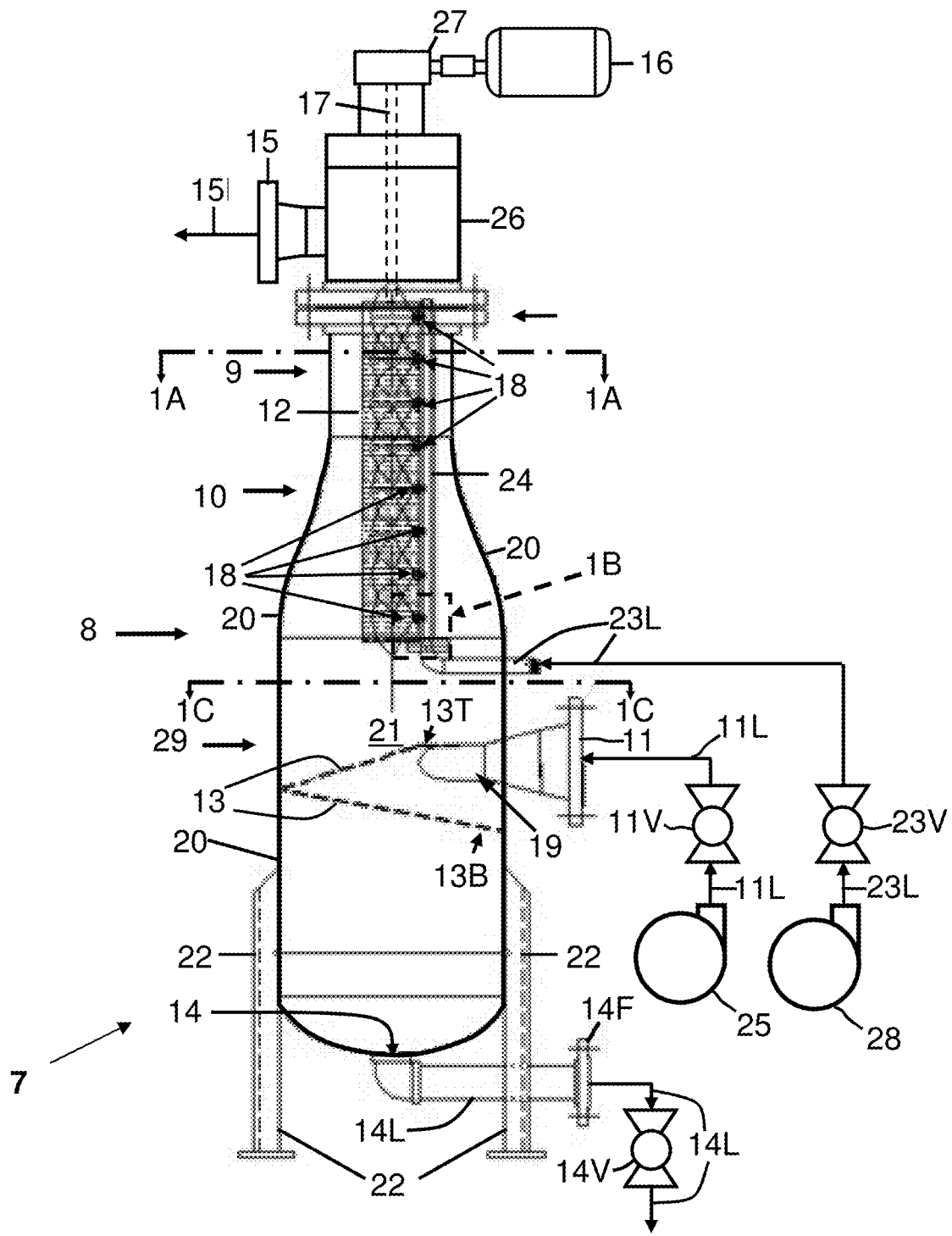
FIGS. 1, 2A, and 2B are schematic diagrams of a partially sectional elevation of a filter system including a vessel that comprises a filter housing adapted for filtering particulates from a liquid, which comprises a vertically oriented vessel that houses an upper filter element. The vessel has a wide lower portion and a narrow cylindrical top, above an intermediate waist which is wider at the bottom than the top.
Figure 2A:
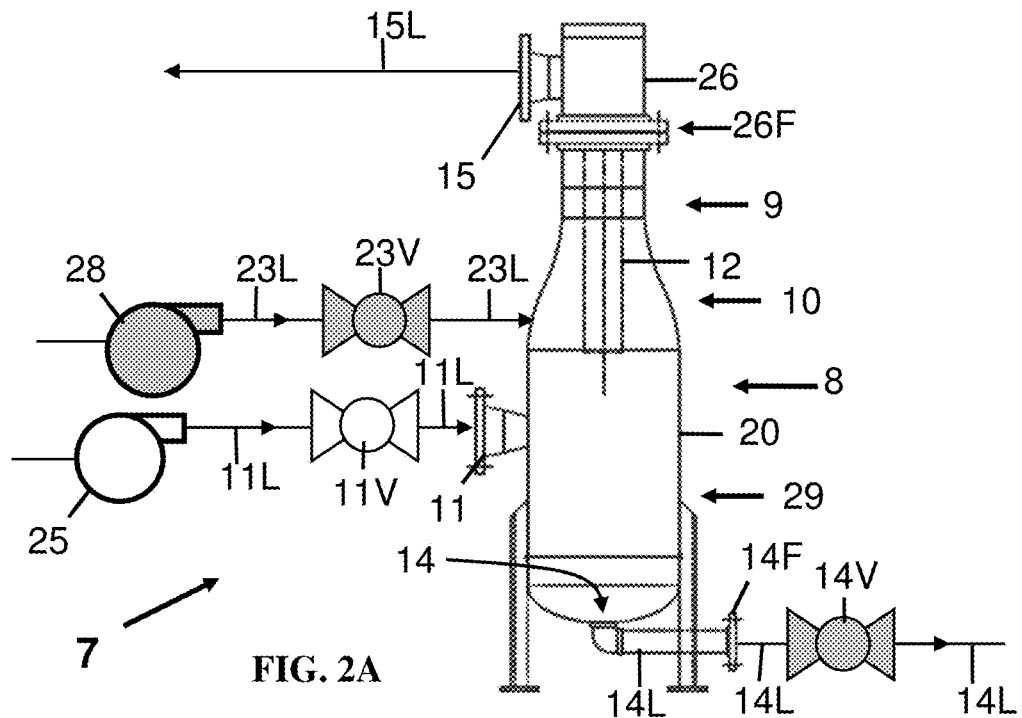
Figure 2B:
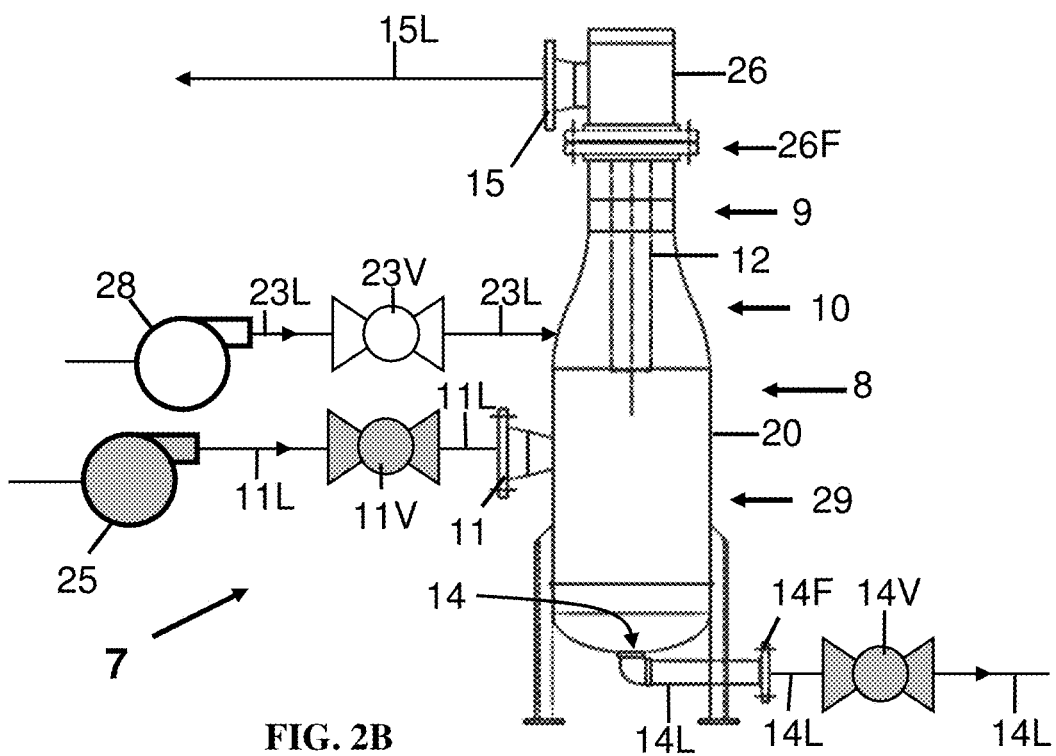

FIGS. 1, 2A and 2B are schematic diagrams of a partially sectional elevation a filter system 7 including a vessel 8 that comprises a filter housing adapted for filtering particulates from a liquid, which comprises a vertically oriented vessel that houses an upper filter element 12. Vessel 8 has a wide lower portion 29 and a narrow cylindrical top 9, above an intermediate waist 10, which is wider at the bottom than at the top thereof.

The lower portion 29 of the vessel 8 includes a swirl plate 13 and an unclean liquid input nozzle 19 for generating a downward liquid vortex. The upper filter element 12 is located in the top 9 and the intermediate waist 10, above the lower portion 29. The filter system 7 has a filtering cycle of operation during which particulates are precipitated to the bottom of the vessel 8 and are collected on the exterior surface of the filter element 12 as filtered liquid is discharged from the vessel 8.

Periodically the filtering cycle of operation of the filter system 7 is interrupted by the cleaning cycle of operation which employs cleaning the cylindrical upper filter element 12 with high pressure sprays of clean process liquid from the array of high pressure nozzles 18. The high pressure nozzles 18 shown in FIG. 5, which are formed in an array, are located above the lower portion 29 of the vessel 24 juxtaposed with and directed towards the exterior surface of the upper filter element 12 by means described in more detail below. During the cleaning cycle, particulates are flushed from the exterior surface of the upper filter element 12 by the liquid sprayed at high pressure from the array of high pressure nozzles 18 so that the particulates fall to the bottom of the vessel 8. The contaminants and particulates are collected there, at the bottom of the vessel 8, until they are periodically drained therefrom through a drain 14 at the bottom of the vessel 24.

Filtering System

Filter system 7 includes a vertically oriented vessel 8 with a vertical axis. As stated above the vessel 8 has the cylindrical top portion 9, a narrowing waist 10, and the cylindrical lower portion 29. In addition, the vessel 8 includes an outer wall 20 which extends down from the cylindrical, top portion 9 to the gradually widening waist portion 10 to a cylindrical, lower portion 29 with the drain 14 at the bottom thereof. The cylindrical, top portion 9 contains a cylindrical filter element 12 coaxial with the vessel 8, which is suspended by a shaft 17 for rotation on its vertical axis. The portion of the wall 20 in the narrow top cylindrical portion 9 of the vessel 8 gradually widens at its waist 10 to a larger diameter in the lower portion 29, where a nozzle 19 and a swirl plate 13 are located. The vessel 8 is supported by legs 22 affixed to the wall 20.

The lower portion 29 of the vessel 8 includes a first inlet 11 for supplying unclean liquid through an unclean liquid inlet nozzle 19. The nozzle 19 is directed at the lower surface of a swirl plate 13. A pump 25 is provided to supply unclean liquid to be filtered to the lower portion 29 of the vessel 8 through the series connections of a first inlet valve 11V with inlet lines 11L. Vessel 8 includes an inlet nozzle 19 extending through the wall 20 of the vessel 8 into the lower portion 29 to eject unclean liquid flowing from the first inlet 11 onto the lower surface of the swirl plate 13 and onto the interior surface of the wall 20. Swirl plate 13 slopes downwardly from its top end 13T and it spirals around the vessel 8 on the inner surface of the wall 20 to its bottom 13B to generate a downwardly directed liquid vortex of liquid towards the drain 14 at the bottom of vessel 8.

When liquid nears the bottom of the vessel 8, it is free to flow through a central column 21 up from the lower portion 29 into the waist 10 where it passes through the filter element 12. Above the vessel 8 and the filter element 12 is a discharge manifold 26 (i.e. plenum) which is connected to the outlet of the filter system 7. The discharge manifold 26 is connected to discharge filtered liquid through a discharge nozzle 15, and discharge lines 15L which are connected in series as shown to discharge filtered liquid pumped through filter system 7. The first inlet valve 11V may be open or closed as described in more detail below with reference to FIGS. 2A and 2B.

The top end 13T of the swirl plate 13 is positioned above the outlet of the liquid inlet nozzle 19. Thus, the swirl plate 13 diverts the liquid flow from nozzle 19 downwardly towards the drain 14. The downwardly directed liquid vortex creates a centrifugal force in the liquid which drives heavier particulates suspended in liquid flowing through the housing 8 outwardly towards the inner surface of the vessel wall 20 as the liquid disperses towards the bottom of the lower portion 29 of the vessel 8. At the same time the incoming liquid from the liquid inlet nozzle 19 flows downwardly towards the drain 14 at the bottom of the lower portion 29 of the vessel 8 and away from the filter element 12. The heavy particulates in the liquid settle out near the drain 14 at the bottom of vessel 8, allowing somewhat cleaner liquid to flow upward through a central column 21 within the vortex towards the filter element 12 which separates the remaining particulate suspended the liquid therefrom as the liquid passes through filter element 12.

In summary, in the larger diameter lower portion 29 of the vessel 8, the downwardly directed liquid vortex separates suspended contaminants from the unclean liquid flowing through the vessel 8. Thus the downwardly directed liquid vortex allows the larger unclean particulates to precipitate to the bottom of the vessel 8, thereby minimizing the amount of particulate material that can reach the upper filter element 12.

As stated above, the cylindrical upper portion 9 of the vessel 8 widens in the waist 10 to a larger diameter in the cylindrical lower portion 29. The downwardly directed liquid vortex is created by the liquid jet from the inlet nozzle 19 which ejects the liquid tangentially in the lower portion 29 along the inner surface of the vessel wall 20 onto the lower surface of the swirl plate 13. The liquid is then forced downwardly by the swirl plate 13 towards drain 14 at the bottom of the lower portion 29 of the vessel 8. The result is that the centrifugal force generated by the liquid vortex separates the heavier particulates from the liquid by forcing them to the perimeter of the vessel wall 20 and allowing them to settle in the bottom of the vessel 8.

The vessel 8 is designed to employ a motorized upper filter element 12. A motor/drive train comprises a transmission 27 and a motor 16. The motor, which is mounted on the discharge manifold 26 above the vessel 8 and a drive shaft 17, extends below the discharge manifold 26. The motor 16 and the transmission 27 turn the drive shaft 17 that rotates the upper filter element 12 on its vertical axis within the vessel 8. Motor 16 operates the transmission 27 which turns the drive shaft 17, which rotates the filter element 12 on a vertical axis within the vessel 8.

Filtering Process

The Vortex

As stated above, the vessel 8 is provided with the first inlet 11 for unclean liquid contaminated with particulates which need to be removed before they reach the discharge nozzle 15. As explained below, the larger particulates are precipitated to the bottom of the vessel 8. The vessel 8 includes the unclean liquid inlet nozzle 19 supplied with unclean liquid flowing through the first inlet 11. To create a downwardly directed liquid vortex, the vessel 8 is provided with a downwardly sloping, swirl plate 13 which is a relatively narrow spiral ramp affixed to the interior surface of the vessel wall 20. The swirl plate 13 wraps around the inner surface of the vessel wall 20. The upper end of the spiral, swirl plate 13 is located just above the unclean liquid inlet nozzle 19 so that the unclean liquid directed by the nozzle 19 onto the lower surface of the swirl plate 13 is driven down along the inner surfaces of the vessel wall 20.

In summary, the top end 13T of the downwardly sloped swirl plate 13 is positioned above the unclean liquid inlet nozzle 19 and the swirl plate 13 is wide enough to intercept unclean liquid passing from the first inlet 11 through the inlet nozzle 19 and to deflect it downwardly. Preferably, the swirl plate 13 and the unclean liquid inlet nozzle 19 are located in the larger diameter lower portion 29 of the vessel 8 where the downwardly directed liquid vortex collects suspended contaminants and particulates and thereby minimizes the amount of particulate material which reaches the filter element 12.

The flow of unclean liquid to be filtered into the vessel 8 is provided by a pump 25 which is delivered through the unclean liquid inlet nozzle 19 into the vessel 8 and is discharged through the upper discharge manifold 26 and outlet 15. During this process, the clean process liquid line 23 and the clean process liquid manifold 24 are isolated from the pump 28 by the input valve 23V.

Upward Flow in Central Column

Since the swirl plate 13 is narrow, it leaves an opening in the center of the vessel 8 thereby providing a central column 21 through which the liquid can flow in the center of the vessel 8. The lower surface of the swirl plate 13 forces unclean liquid which enters the vessel 8 to flow downwardly along the inner surface of the vessel wall 20. The upper end of the spiral, swirl plate 13 is located just above the liquid inlet nozzle 19. Thus, the unclean liquid directed onto the surface of the swirl plate 13 is driven down along the inner surfaces of the vessel wall 20. The downward current along the inner surface of the vessel wall 20 induces a downwardly directed liquid vortex in the liquid as it flows towards the bottom of the vessel 8. The downwardly directed liquid vortex in the liquid forces heavier particulates to collect on the inner surface of the vessel wall 20, and forces partially cleaned liquid to flow downwardly, away from the filter element 12. As a result the heavier particulates settle out of the liquid, allowing cleaner liquid to flow upward through a central column 21 within the outer, downwardly directed liquid vortex formed by the swirl plate 13. Thus the partially cleaned liquid flows upwardly inside the vessel 8 towards the filter element 12.

In the upper portion of the vessel 8, the filter element 12, which is rotatably suspended from the liquid discharge manifold 26, is provided to capture suspended particulate material from the partially cleaned liquid passing through the central column 21 of liquid flowing up through of the vessel 8, through the filter element 12 and upwardly therefrom towards the liquid discharge manifold 26 at the cylindrical top portion 9 of the vessel 8. As the partially cleaned liquid passes through the filter element 12, particulate accumulates on the exterior of filter element 12.

Filter Cleaning Process

Figure 5:
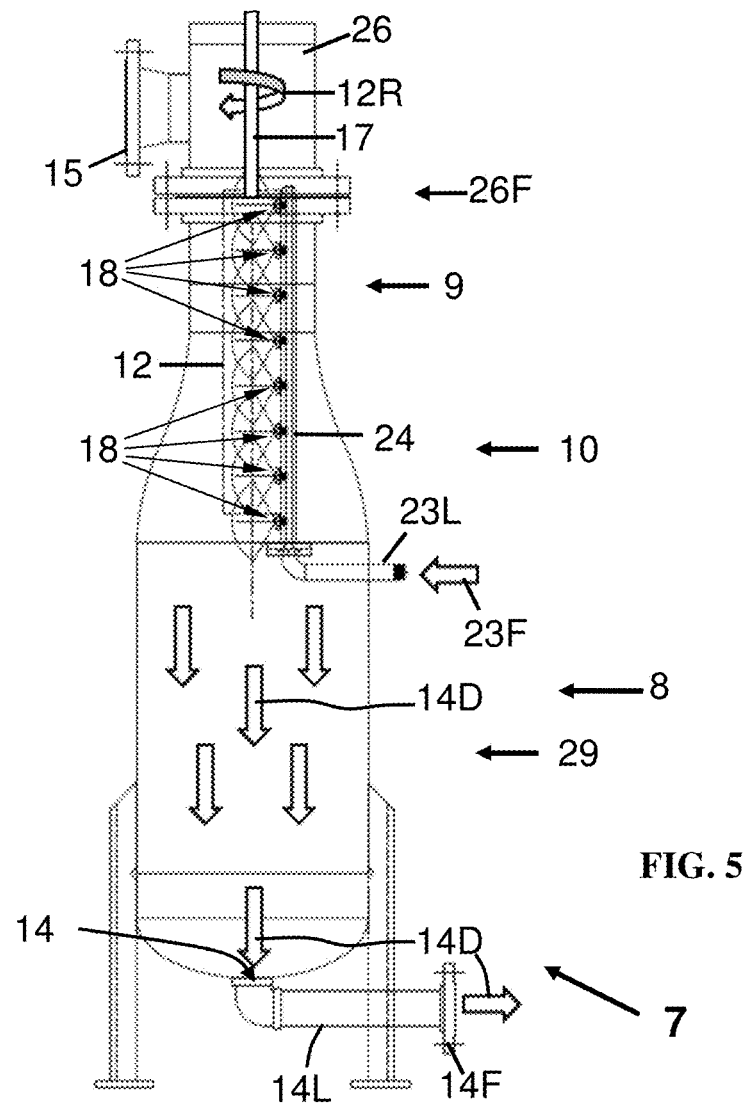
FIG. 5 is a schematic diagram illustrating the nozzles cleaning the exterior surface of filter element with the high pressure clean process liquid spray. Arrows illustrate the flushing through the drain of contaminants from the filter element and the vessel bottom.

A high pressure pump 28 supplies clean process liquid through the series connections of clean liquid lines 23L, and clean liquid input valve 23V to a clean process liquid manifold 24 for distributing clean process liquid to the array of high pressure spray nozzles 18 shown in FIG. 5. The high pressure spray nozzles 18, located in the array above the lower portion 29 of the vessel 24 receive the clean process liquid from the interior of clean process liquid manifold 24. One of the high pressure nozzles 18 is shown in FIG. 1B to have threads that are screwed into a matching threaded tap in the side of the clean process liquid manifold 24. The high pressure spray nozzles 18 are juxtaposed with the filter element 12 so that they can spray clean process liquid onto the exterior of the cylindrical filter element 12 as it rotates on its vertical axis. Each high pressure spray nozzle 18 directs a flat liquid spray (FIG. 1B) of clean process liquid, preferably tangentially to the surface of the filter element 12. As the cylindrical filter element 12 rotates it efficiently cleans the surface of the filter element 12 during a short maintenance cycle to extend the life of the filter element 12, and to aid vessel flushing. Thus, the high pressure spray nozzles 18 are enabled to remove particulates accumulated on the exterior of the filter element 12. This arrangement improves filter cleaning and reduces interruptions of a filtering operation. Removal of particulates in this fashion allows the filter element 12 to operate for long durations before filter element 12 becomes overwhelmed.

Figure 1A:
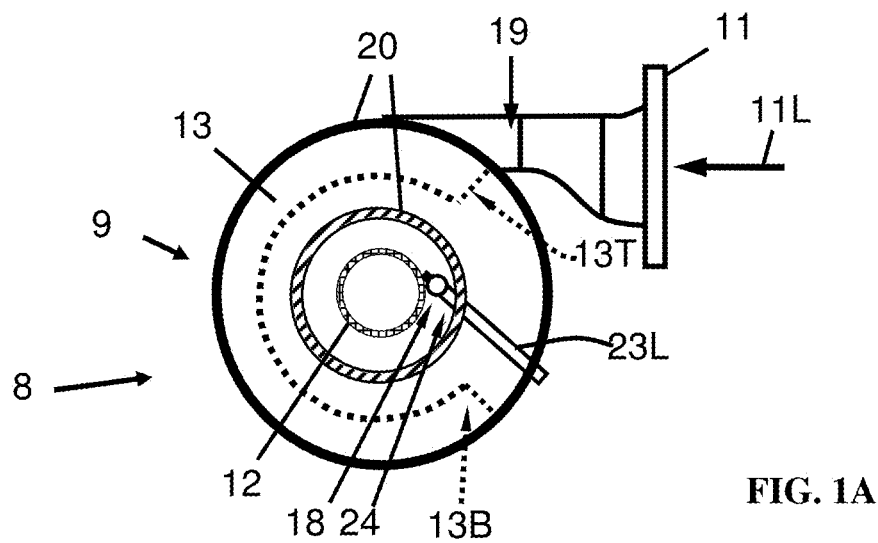
FIG. 1A is a sectional plan view of a self-cleaning filter system in accordance with this invention. The view is taken along line 1A-1A in FIG. 1 showing the upper portion of the vessel and the filter along with a plan view of the liquid inlet to the vessel.
Figure 1B:
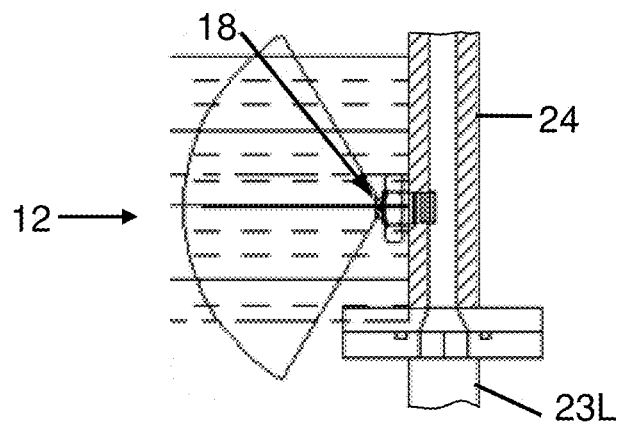
FIG. 1B is a sectional elevational view of detail B shown encircled in FIG. 1 showing a single high pressure orifice juxtaposed with a portion of the filter.

FIG. 1A is a sectional plan view taken along line 1A-1A in FIG. 1 showing the upper portion 9 of the vessel 8, the filter element 12 the housing wall 20, the clean process liquid line 23L for connection to the clean process liquid manifold 24 which supplies clean process liquid as a spray through the high pressure spray nozzle 18. FIG. 1A also shows a plan view of the liquid inlet nozzle 19 integral with the first inlet 11 which is connected in FIG. 1 to the first inlet line 11L for liquid to be filtered to the vessel 8 and also shows phantom outlines of the swirl plate 13 with its top 13T and bottom 13B.

FIG. 1B is a sectional elevational view of the detail B encircled in FIG. 1 showing a high pressure spray nozzle 18 juxtaposed with a portion of the exterior surface of the filter element 12 indicated by phantom lines. Clean process liquid under pressure is supplied through clean process liquid line 23L (from input valve 23V in FIG. 1) which passes into the clean process liquid manifold 24 and is shown sprayed within the arc shown onto the exterior of the filter element 12.

Figure 1C:
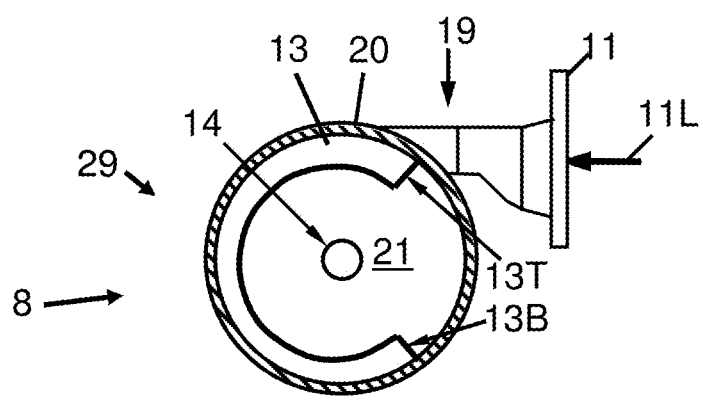
FIG. 1C is a sectional plan view taken along line 1C-1C in FIG. 1 showing the lower portion of the vessel along with a plan view of a swirl plate formed on the periphery of the inner surface of the outer wall of the vessel and a plan view of the liquid inlet to the vessel.

FIG. 1C is a sectional plan view taken along line 1C-1C in FIG. 1 showing the lower portion 29 of the vessel 8 plus a plan view of the swirl plate 13 formed on the inner surface of the vessel wall 20 and a plan view of the first inlet 11 to the vessel 8 supplied with unclean liquid by lines 11L, valve 11V and the pump 25 as shown in FIG. 1.

The filter element 12 is juxtaposed with a high pressure spray nozzle 18 which is employed to clean the exterior surfaces of filter element 12 to restore the filter element to its clean condition without removal of the filter element 12 from the discharge manifold 26 and undergoing alternative cleaning procedures. Cleaning the particulate from the exterior of the filter element 12 allows it to operate for longer durations before becoming overwhelmed with debris. Each of the spaced array of high pressure spray nozzles 18 shown in FIG. 1 directs a flat spray of process liquid tangentially to a portion of the exterior surface of the filter element 12 as it rotates on shaft 17, thereby efficiently cleaning the exterior surface during a short maintenance cycle, which extends the life of the filter, and aids flushing of the vessel 8.

FIG. 2A is an operational diagram of the flow configuration in the system of this invention as positioned during the filtering cycle of operation of the system 7 when particulates are being filtered out of the unclean liquid flowing through the vessel 8. During the filtering cycle, unclean liquid is directed from pump 25 through the liquid inlet nozzle 19 onto the lower surface of the swirl plate 13 so that the unclean liquid flow is directed downwardly around the circumference of the vessel 8 forming the vortex described above.

In the vortex the heavier particulates are segregated through centrifugal, acceleration forces which cause those particulates to migrate away from the center of the vessel towards the vessel wall 20. During the filtering cycle when the first inlet valve 11V is open, the flow of unclean liquid to be filtered is provided by the liquid pump 25. Then that unclean liquid is introduced into the vessel 8 through the inlet nozzle 19 and the initial separation of the larger particulates out of the liquid begins. Then, after passing through the central column 21 and passing through the filter element 12, the filtered liquid is discharged through the upper discharge manifold 26, the discharge nozzle 15, and the discharge line 15L in series.

Referring again to FIG. 2A, during the filtering cycle, shading of the input valve 23V and the drain valve 14V indicates that that those valves are closed so that the clean process liquid line 23L and the clean process liquid manifold 24 and the drain line 14L are isolated by the input valve 23V and drain valve 14V respectively. There is no shading of first inlet valve 11V, as that valve is open and so unclean liquid is free to flow into the vessel 8 through the first inlet line 11L and first inlet 11 and then clean process liquid is free to flow out through the discharge manifold 26 and through the discharge line 15L, when particulates have been filtered out of the liquid. In particular, FIG. 2A shows the conditions of the control valves in the normal mode of operation of filtering liquid with one open (clear) first inlet valve 11V and two closed (shaded) control valves 14V and 23V. The open valve 11V permits the flow of unclean liquid to be filtered during the filtering cycle of operation of the system, when unclean liquid is flowing in through inlet lines 11L, inlet valve 11V, first inlet 11, and liquid inlet nozzle 19 to be ejected by nozzle 19 into vessel 8.

Then, as explained above, after nearing the drain 14, the partially cleaned liquid continues up in the center of the vortex forming a central column 21 of liquid being cleaned flowing up inside the vessel 8 through the filter element 12, and through the discharge manifold 26 and the discharge nozzle 15 and the series connection of the discharge line 15L.

FIG. 2B is an operational diagram of the flow configuration in the system of this invention as positioned during the cleaning cycle, e.g. the filter flushing operation, of the system 7 when particulates are being removed from the exterior surfaces of the filter element 12 and the particulates are being flushed to the bottom of the vessel 8 where they collect until they are periodically removed through the drain 14. During the filter cleaning operation, the flow of unclean liquid through inlet nozzle 19 and out through the discharge manifold 26 is interrupted by the closed valve 11V as indicated by the shading in FIG. 2B. The flow of clean, high pressure process liquid the high pressure pump 28 is directed through the clean process liquid lines 23L and the clean liquid input valve 23V via the clean process liquid manifold 24 to the high pressure spray nozzles 18 from which the clean process liquid is ejected to clean the exterior surfaces of the rotating filter element 12 and to flush the contaminants and particulates from the exterior of the filter element 12 as it rotates. Thus the contaminants and particulates that have been flushed from the filter element 12 are caused to accumulate at the bottom of the vessel 8. The drain valve 14V at the bottom of the vessel 8 is shown closed in FIG. 2B. However, periodically, drain valve 14V is opened for removal the contaminants and particulates from the vessel 8 by ejecting them out through the drain 14 and therefrom out through series connections of drain lines 14L, flange 14F, and drain valve 14V.

Figure 3A:
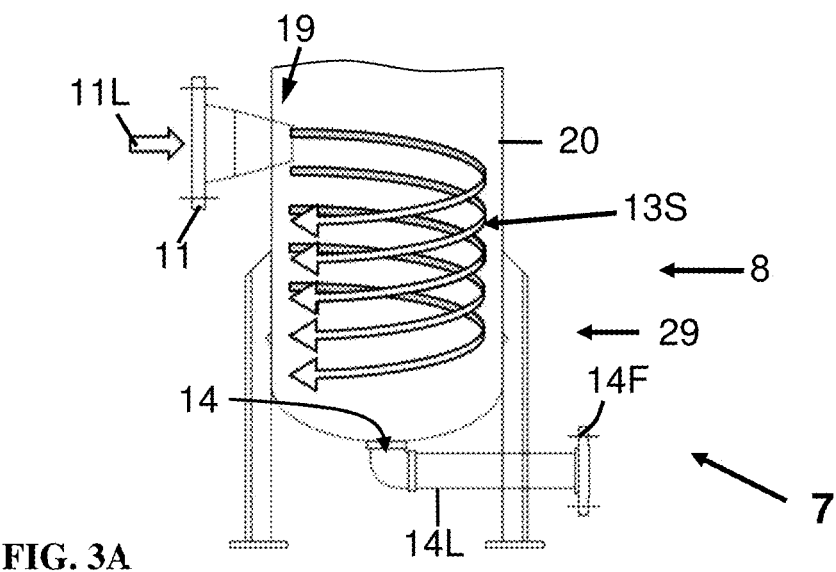
FIG. 3A is a schematic diagram illustrating a swirling vortex flow induced by the downwardly sloped swirl plate which directs the liquid flow downwardly in the periphery of the lower section of the vessel away from the filter.

FIG. 3A is a schematic diagram illustrating a swirling vortex flow 13S induced by the swirl plate 13 which directs the liquid flow downwardly in the periphery of the lower portion 29 of the vessel 8 showing the only the vortex flow 13S which is directed downwardly toward the drain 14 in the vessel 8 away from the waist 10, the top portion and the filter element 12.

Figure 3B:
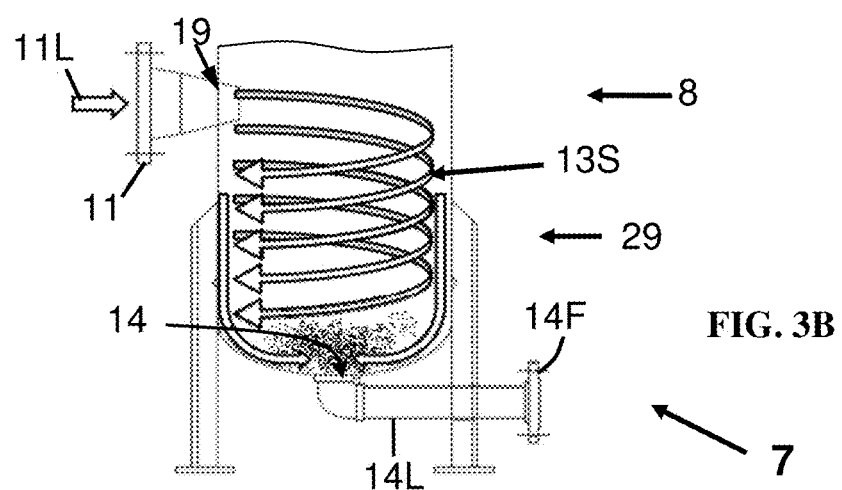
FIG. 3B illustrates that the particulates that gathered on the perimeter of the vessel increase to a high concentration and precipitate into the lower stagnant, low flow rate region of the vessel just above a drain where the particulates collect.

FIG. 3B illustrates that the contaminants and the particulates that are gathered on the perimeter of the vessel 8 have increased to a high concentration and have precipitated into the lower stagnant, low flow rate region of the vessel 8 just above the drain 14 where the contaminants and the particulates collect.

Figure 4:
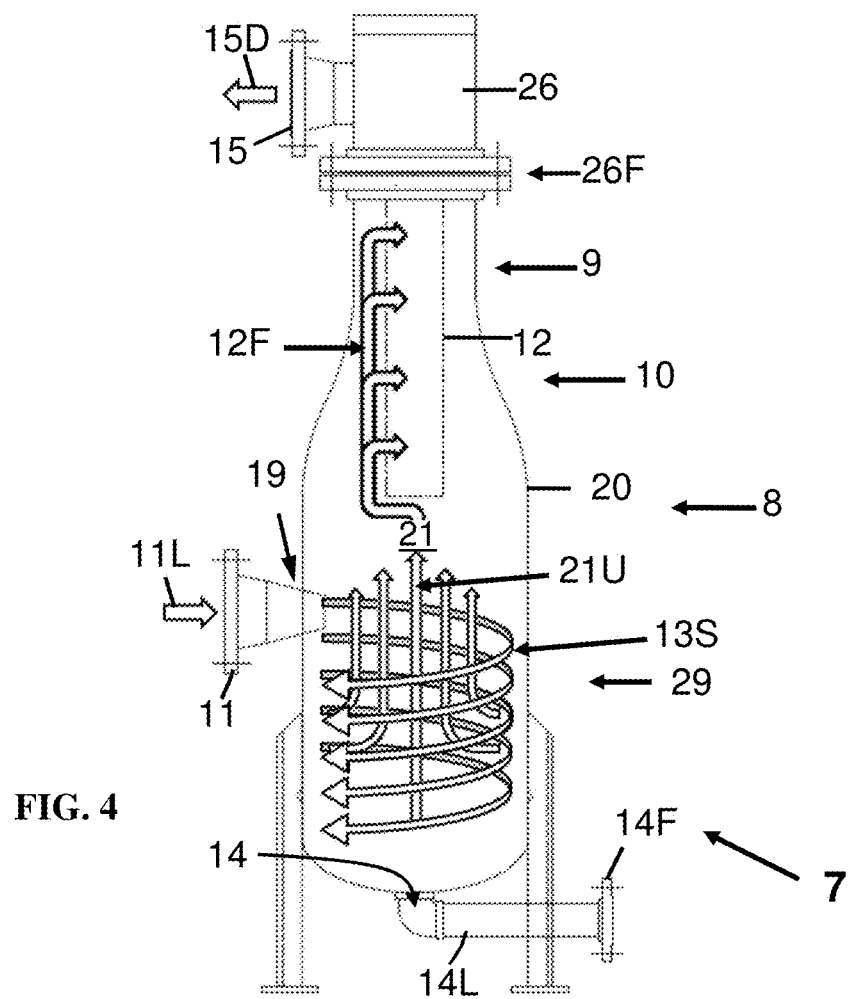
FIG. 4 is a schematic diagram with arrows illustrating both the downward flow of liquid from the nozzle towards the bottom of the vessel and the upward flow of liquid in the center of the vortex and in the central column indicated by arrows from above drain at the bottom of the vessel towards the filter.

FIG. 4 is a schematic diagram with arrows 13S illustrating both the downward flow of liquid from the nozzle 19 towards the drain 14 and an upward flow of liquid in the center of the vortex and in the central column 21 indicated by arrows 21U from above the drain 14 at the bottom of the vessel 8 towards the waist region 9 and the filter element 12. Above that, the arrow 12F illustrates the flow of liquid into the filter element 12. The partially cleaned liquid from the inner portion of the vortex that has a lower concentration of the particulates is having additional particulates removed therefrom by filter element 12. Then the filtered liquid which has been passed through the filter element 12 is discharged through the discharge manifold 26 and the discharge nozzle 15 as indicated by discharge arrow 15D.

FIG. 5 is a schematic diagram illustrating the nozzles 18 cleaning the exterior surface of filter element 12 with the high pressure spray of clean process liquid. The arrows 11D illustrate the flushing of contaminants from the filter element 12 and the bottom of the vessel through the drain 14. During the filter cleaning cycle, when the filter element 12 becomes clogged with the collection of particulates or when it is necessary to discharge particulate collected above the drain 14, the vessel 8 is isolated from the system 7 by closure of the first inlet valve 11V. The particulates (sludge) collected in the bottom of the vessel 8 are drained through the drain line 14 when the drain valve 14V opens. Inlet flow of clean process liquid under high pressure is introduced through clean process liquid line 23 and it is then directed through the clean process liquid manifold 24 to the array of high pressure nozzles 18 and the filter element 12 is rotated using the filter drive motor 17 and the drive train including the drive shaft 12S. A flat spray of process liquid cleans the surface of the filter element 12 and flushes the contaminants and particulates to the bottom of the vessel 8.

Periodically, as indicated by the arrows 14D in FIG. 5, the drain valve 14V in FIG. 2B is opened for removal of the contaminants and particulates through the drain 14 and the drain lines 14L in FIG. 2B.

Figure 6:
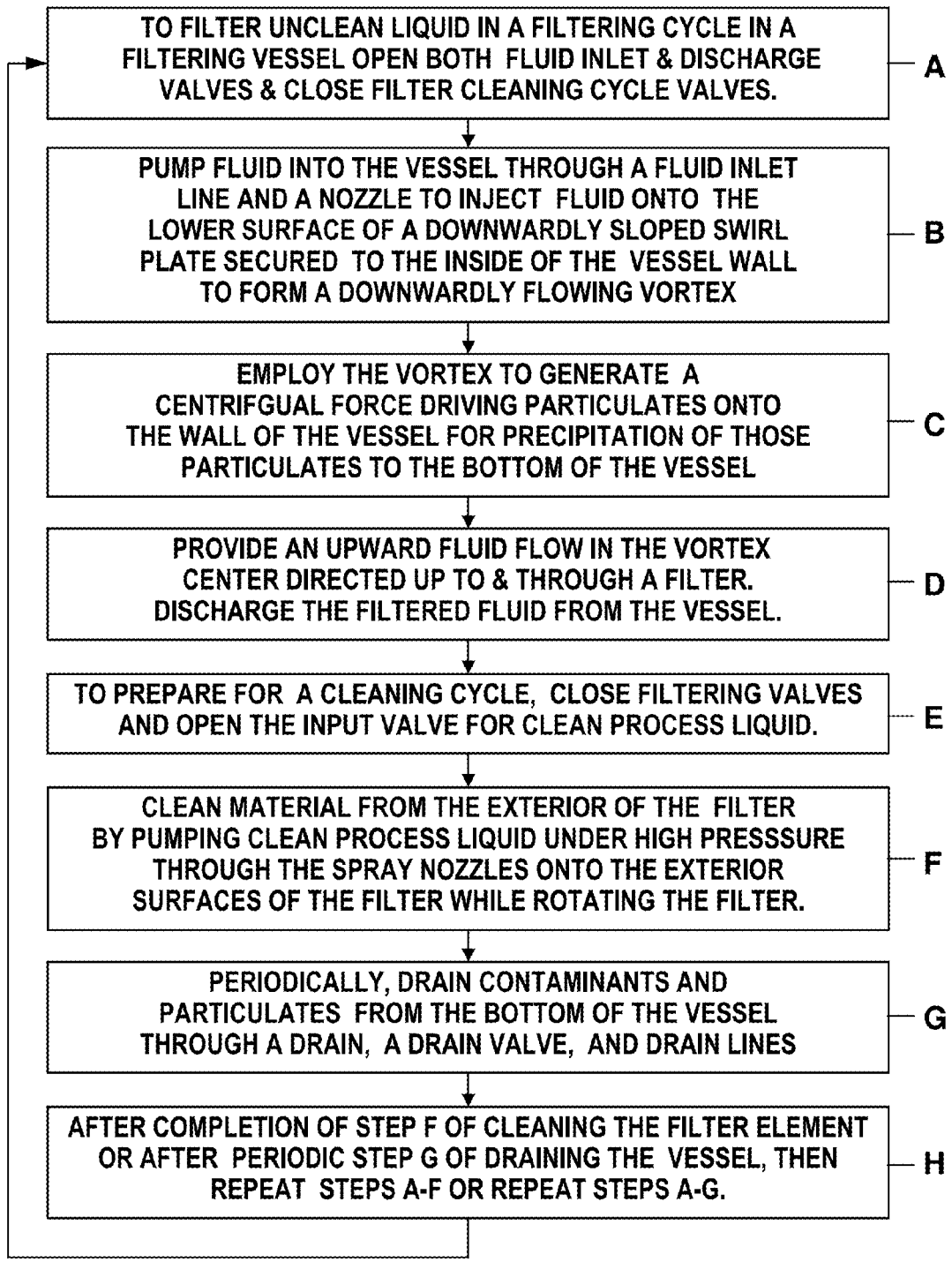
FIG. 6 is a flow chart illustrating the process of this invention.

FIG. 6 is a flow chart illustrating the process of this invention which includes the steps as follows:

Step A To clean unclean liquid by using a filtering cycle for filtering particulates from a vessel 8, open the filtering cycle liquid inlet valve 11V and close the input valve 23V and the drain valve 14V, which are open later during the subsequent filter cleaning cycle.

Step B Pump the unclean liquid into the vessel 8 from pump 11V via first inlet valve 11V the liquid inlet lines 11L and the nozzle 19. The nozzle 19 injects the unclean liquid onto the lower surface of a downwardly sloped swirl plate 13 formed on the inner surface of the wall 20 of the vessel 8 forming a downward flowing vortex.

Step C Employ the vortex to generate a centrifugal force driving particulates onto the wall 20 of the vessel 8 for precipitation of them to the bottom of the vessel by directing liquid ejected from the nozzle 19 under the swirl plate 13 to flow down towards the bottom of the vessel 8. The swirling unclean liquid creates a centrifugal force driving particulates to the inner periphery of the wall 20 followed by precipitation thereof to the bottom of vessel 8.

Step D Provide an upward liquid flow in the vortex center directed to and through a filter element 12 and passing out of vessel 8 through discharge line 15L.

Step E Close the filtering valve 11V and open the input valve 23V which supplies cleaning liquid to the vessel 7. Preferably the drain valve 14V remains closed, except when opened during performance of step G below.

Step F Operate the high pressure pump 28 to supply clean process liquid through the input valve 23V, spray line 23L, spray manifold 24 and the array of spray nozzles 18. During the cleaning cycle, accumulated contaminants and particulate material are cleaned from the exterior of the filter element 12 by spraying liquid under high pressure through the spray nozzles 18 onto the exterior surface of the filter element 12 while rotating the filter with shaft 17 which is driven by motor 16 and transmission 27.

Step G Periodically, drain contaminants and particulate material from the bottom of the vessel 8 through the drain 14, the drain lines 14L and the drain valve 14V. As an alternative, draining through the drain 14 can be performed during each cleaning cycle.

Step H After completion of steps E, F and (periodically step G) the vessel can be placed back into the filtration mode and, then repeat steps A-H.

The foregoing description discloses only exemplary embodiments of the invention. Modifications of the above disclosed apparatus and methods which fall within the scope of the invention will be readily apparent to those of ordinary skill in the art. While this invention is described in terms of the above specific exemplary embodiment(s), those skilled in the art will recognize that the invention can be practiced with modifications within the spirit and scope of the appended claims, i.e. changes can be made in form and detail, without departing from the spirit and scope of the invention. Accordingly, while the present invention is disclosed in connection with exemplary embodiments thereof, it should be understood that changes can be made to provide other embodiments which may fall within the spirit and scope of the invention and all such changes come within the purview of the present invention and the invention encompasses the subject matter defined by the following claims

The invention claimed is:

1. An enclosed vessel for cleaning unclean liquid comprising:
   said enclosed vessel for cleaning said unclean liquid having a wall with an inner surface;
   means for creating a downwardly directed liquid vortex of said unclean liquid admitted through an inlet nozzle extending through said wall;
   a filter element located in said vessel above said inlet nozzle with said filter element having an exterior surface and an interior surface,
   with said interior surface connected to an outlet for discharging filtered liquid from said vessel;
   means for cleaning said exterior surface of said filter element by spraying clean liquid from at least one high pressure spray nozzle supplied with said clean liquid from a high pressure pump onto said exterior surface; and
   wherein said at least one high pressure spray nozzle is different from said inlet nozzle.

2. The vessel of claim 1 wherein:
   said vessel extends vertically;
   said means for creating said downwardly directed liquid vortex includes a downwardly sloped swirl plate spiraling around on the inner surface of said vessel with said swirl plate having a lower surface; and
   said inlet nozzle having an orifice juxtaposed with and directed towards said lower surface of said swirl plate.

3. An enclosed vessel for cleaning an unclean liquid:
   said enclosed vessel defining an inner space with an inner surface and said enclosed vessel having a wall;
   means for admitting said unclean liquid into said inner space in said vessel through an inlet nozzle extending through said wall;
   means for creating a downwardly directed liquid vortex of said unclean fluid within said inner space;
   an outlet for discharging filtered liquid from said vessel;
   said filter element for cleaning said unclean liquid located in said vessel above said inlet nozzle;
   said filter element having an exterior surface and an interior surface with said interior surface connected to an outlet for discharging a filtered liquid from said vessel;
   a high pressure pump for supplying clean liquid connected to supply clean liquid to an array of high pressure spray nozzles, with said array of high pressure nozzles juxtaposed with said filter element;
   said array of high pressure spray nozzles being connected to direct said clean fluid under high pressure onto said exterior surface of said filter element to clean said exterior surface; and
   wherein said array of high pressure nozzles are different from said inlet nozzle.

4. The vessel of claim 3 wherein:
   an inlet pump for said unclean liquid to be filtered is connected through a first inlet valve to said liquid inlet nozzle; and said high pressure pump for clean liquid is connected through a clean liquid valve to supply clean liquid to said array of high pressure nozzles high pressure spray nozzles juxtaposed with said filter element.

5. The vessel of claim 4 wherein:

said vessel includes a drain at the bottom thereof connected through a drain valve adapted to be closed during a filtering cycle.

6. The vessel of claim 4 wherein said filter element is suspended from a rotatable shaft.

7. A method employing an enclosed vessel for containing and for cleaning unclean liquid comprising:

providing said enclosed vessel for containing and for cleaning said unclean liquid, with said vessel having a wall and with said enclosed vessel having an inner surface;

providing a means for creating a downwardly directed liquid vortex of said unclean admitted into said enclosed vessel through an inlet nozzle for said unclean liquid with said inlet nozzle projecting through said wall;

providing a filter element located in said enclosed vessel above said inlet nozzle, with said filter element having an exterior surface and an outlet;

providing a discharge means coupled to said outlet for discharging filtered clean liquid from said vessel;

cleaning said exterior surface of said filter element by spraying clean liquid from at least one high pressure spray nozzle supplied with said clean liquid from a high pressure pump onto said exterior surface of said filter element; and wherein said at least one high pressure spray nozzle is different from said inlet nozzle.

8. The method of claim 7 including providing means for rotating said filter element in said vessel above a downwardly sloped swirl plate spiraling around on the inner surface of said vessel with said swirl plate having a lower surface for creating said vortex.

9. The method of claim 8 including:

providing a high pressure pump for clean liquid connected through a clean liquid valve to supply clean liquid to said at least one high pressure spray nozzle juxtaposed with said rotatable filter element; and providing an inlet pump for unclean liquid to be filtered connected through a first inlet valve to said inlet nozzle.

10. The method of claim 9 including:

suspending said routable filter element from a rotatable shaft;

connecting said at least one high pressure spray nozzle and an array of other high pressure spray nozzles to a manifold juxtaposed with said filter element; and connecting said manifold to said clean liquid valve.

11. The method of claim 9 including:

providing said rotatable filter element with a spray of clean liquid supplied through a clean liquid valve to said at least one spray nozzle, with said clean liquid valve operable to open and closed positions;

providing said vessel with a drain at the bottom thereof connected through a drain valve operable to open and closed positions; and opening said first inlet valve and said discharge valve during a filtering cycle and closing said first inlet valve and said discharge valve during a filter cleaning cycle.

12. The method of claim 9 including:

providing said vessel with a drain at the bottom thereof with said drain connected through a drain valve adapted to be periodically opened during a filter cleaning cycle, and said drain valve adapted to be closed during a filtering cycle.

13. The method of claim 7 including:

including said at least one high pressure spray nozzle in an array of other high pressure spray nozzles with said array of other high pressure spray nozzles juxtaposed with said filter element;

supplying said clean liquid to said array of other high pressure spray nozzles from said high pressure pump, and positioning said array of other high pressure spray nozzles to direct said clean fluid under high pressure onto said exterior surface of said filter element to clean said exterior surface.

* * * * *